Aug. 9, 1966 R. C. RUSSELL 3,265,173
SLIDING CLUTCH GEAR
Filed Dec. 18, 1961 2 Sheets-Sheet 1
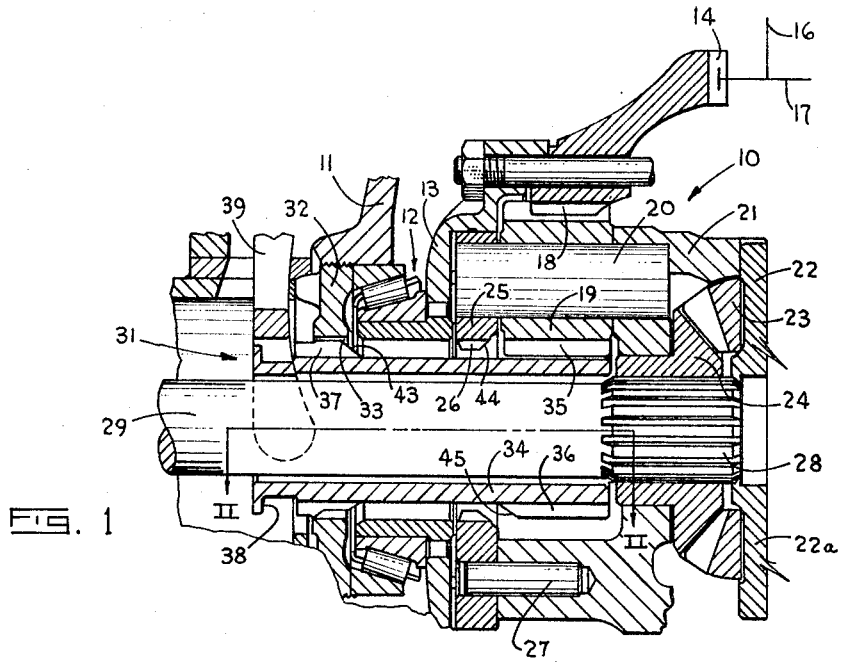
FIG. 1
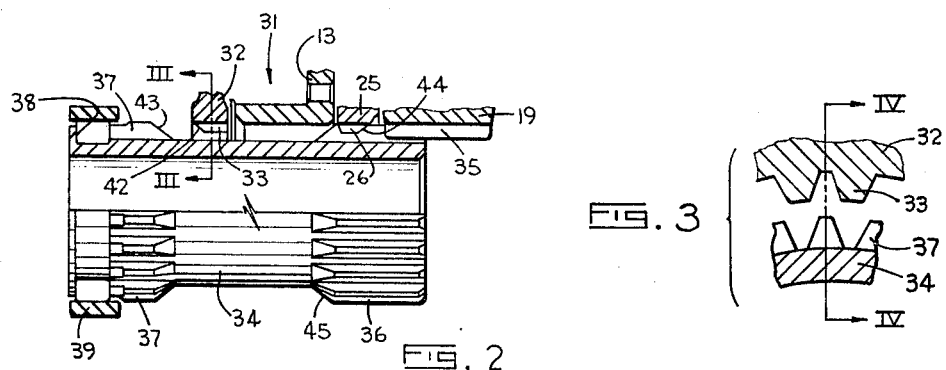
FIG. 2
FIG. 3
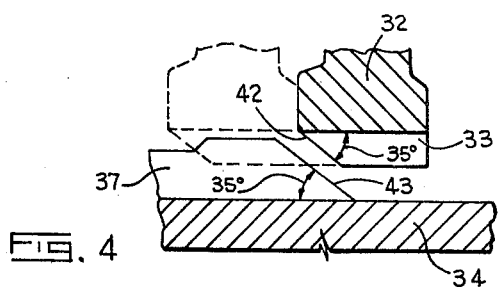
FIG. 4
*INVENTOR.*
ROBERT C. RUSSELL
BY Woodhams Blanchard y Flynn
*ATTORNEYS*

Aug. 9, 1966  R. C. RUSSELL  3,265,173
SLIDING CLUTCH GEAR
Filed Dec. 18, 1961  2 Sheets-Sheet 2
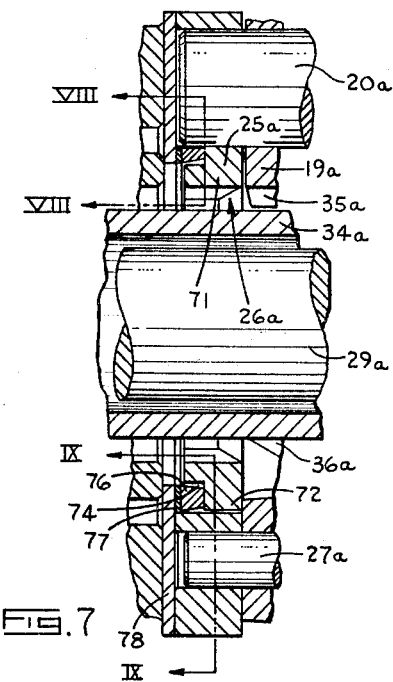
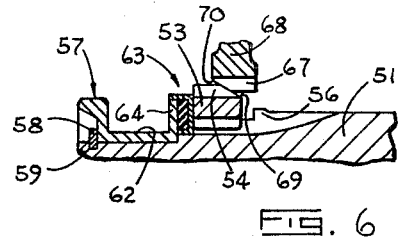
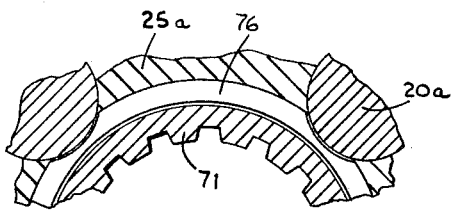
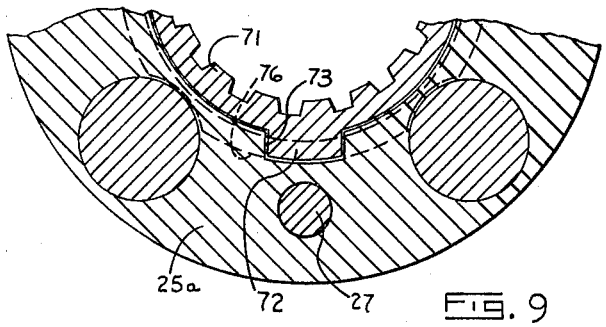
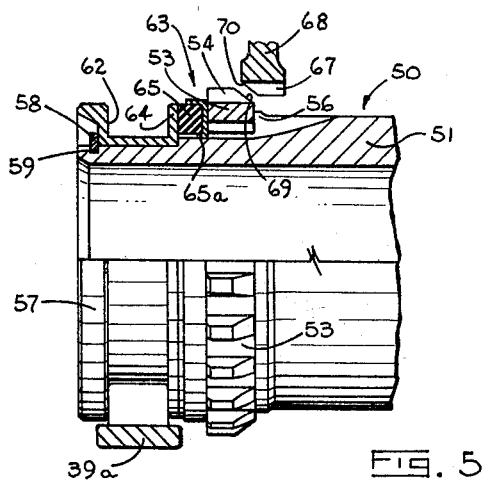
INVENTOR.
ROBERT C. RUSSELL
BY Woodhams, Blanchard & Flynn
ATTORNEYS

3,265,173
SLIDING CLUTCH GEAR
Robert C. Russell, Asheville, N.C., assignor to Eaton Manufacturing Company, Cleveland, Ohio, a corporation of Ohio
Filed Dec. 18, 1961, Ser. No. 160,033
4 Claims. (Cl. 192—67)

This invention relates to sliding clutch construction and it relates particularly to arranging a pair of interengageable toothed clutches to facilitate their interengagement without the use of synchronizers but yet with a minimum of clashing thereof as interengagement takes place.

The present invention developed as a result of a problem occurring in the field of two speed axle construction for automotive use. Accordingly, it will be discussed in terms of such use but it will be borne in mind that such specific use is for illustrative purposes only and that the clutch construction hereafter described is of wide applicability. Particularly the invention is also useful for the positively interengageable jaw clutch teeth used in various types of automotive transmissions.

Jaw clutches, often called dog tooth clutches, have been known for a long time and have been used for a multitude of specific uses, including particularly various kinds of ratio gear sets wherein it is desired to connect and disconnect a gear to or from the shaft around which it is positioned. Inasmuch as a gear which carries one side of the jaw clutch and a shaft which carries the other side of the jaw clutch are usually rotating at widely different speeds at the beginning of a shifting operation, it has always been a severe problem to effect such interengagement without excessive clashing of the gears. The use of synchronizers is, of course, well known for minimizing such clashing and for the same purpose the facing or meeting edges of the teeth have been made in a wide variety of shapes. Particularly, it has been common to round or bevel said teeth circumferentially in order that said teeth may somewhat lead themselves into each other. Such teeth, although commonly referred to as "bullet nose" teeth, are not tapered or angled in a radial plane.

However, such circumferential tapering of the teeth standing by itself often also tends to resist interengagement inasmuch as a pair of mutually tapered teeth striking each other on their tapered surfaces develop a strong component of force for moving said teeth away from each other. Thus, unless the force urging an interengagement is applied to the relatively movable parts carrying said teeth with sufficient magnitude to overcome such rejecting tendency, the rounding of the teeth may actually cause them to reject each other and no interengagement is accomplished. On the other hand, where such force is applied in sufficient magnitude to overcome such rejecting tendency there is in many instances a strong possibility of pushing the parts together with such force as to effect damage thereto.

Similarly, the sloping or tapering of interengaging jaw clutch teeth in a radial direction to form a conical end shape has also been previously known but this has in the past been of only minor assistance in effecting a smooth interengagement of such teeth because the slope of such radial tapering formed an angle of 60 degrees or more with respect to the axis of the rotating parts being interengaged. Unexpectedly, however, it has been discovered that by changing the slope of such radial tapering to an angle of between about 30 and about 40 degrees with respect to the axis of the rotating parts being interengaged, the interengagement of the parts is greatly facilitated, and other further advantages are obtained. Among these further advantages may be included the following:

(1) Increased contact area at the mating ends of teeth, which reduces the shock load per unit area of said mating ends and thereby minimizes wear and deformation of the mating ends of the teeth. This brings about longer wear life and minimizes or eliminates chipping.

(2) A tooth centering condition is provided which improves the interengagement of the teeth where there is no close bearing support.

(3) The tendency for the interengaging teeth to hammer is reduced, inasmuch as the force developed as the teeth contact each other is absorbed by the engagement angle of the mating faces which diverts much of the force radially. In conventional toothed structures, the force is axial and hence the full amount thereof tends to repel the teeth away from interengagement. Thus, the invention provides a much smoother engagement than is obtained by conventional toothed shape.

(4) The diminished hammering also results in diminished loads applied to the shift fork. With a bullet nose tooth shape, as the movable shift member hammers the repelling force between the teeth opposes the advancing force applied by the shift fork thus imposing very high shock loads on the shift fork. Where much of the intertooth force is deflected radially by the angle of the teeth as provided in the present invention, these loads on the shift fork are greatly diminished.

(5) The increase in the areas of the mating faces of the teeth without reduction in the cross-sectional areas available for sliding into interengagement thereof, gives the teeth an opportunity to act somewhat as their own synchronizing surfaces and will still be enabled to slide into interengagement with each other when the relative speeds reach synchronsim.

However, if the angle is increased to a value greater than 40 degrees, the resulting structure is decidedly inferior to a structure having an angle of between about 30 and about 40 degrees. If the angle is decreased to an amount less than about 30 degrees, but above about 12 degrees, the operation remains satisfactory but the axial travel required to move the clutch from a fully disengaged to a fully engaged position is too great for a commercially useful device. At or below about 12 degrees, the parts wedge with respect to each other and are inoperative.

In addition to easing the interengagement of toothed elements, such as jaw clutches, by adopting the proper angle of contact with respect to each other as above set forth, it has long been known that the impact between said teeth can be minimized by reducing the mass of the toothed element which is caused to move in response to the striking of one set of teeth against the other. However, reduction in mass of the parts concerned has in the past been thought to be definitely limited in view of the strength requirements for the parts concerned. Thus, a further aspect of the present invention improves this condition by separating one set of the interengageable teeth from rigid connection to the part carrying said teeth, enabling said set to move axially with respect to said part and giving it a resilient backing in a direction opposing the direction in which said set of teeth will be urged when said set of teeth impacts against the adjacent set. Thus, to move the movable teeth back away from the other set of teeth as a result of a contact between the two sets of teeth requires overcoming only the inertia of a relatively small ring plus the urging of a relatively light spring, all of which requires much less force than that required to overcome the inertia of a relatively heavy tooth-carrying part, such as a clutch sleeve. This further eases the contact between sets of interengaging teeth and further assists the meshing thereof without the use of synchronizers but yet without encountering unreasonable clashing, wear and noise.

This arrangement in association with the tapered mating faces of the interengageable teeth as above set forth brings about an unexpected advantage in that these two features appear to cooperate to promote the action of each other in quite a synergistic fashion. While the reason for this is not fully understood, the results have been definitely observed and are known to exist. The placement of teeth on a separate ring as above mentioned is not feasible where conventional teeth faces are used inasmuch as the repelling force of the teeth with respect to each other is so great that the resilient force urging said teeth into engagement is ineffective unless the resilient means is made so strong as to virtually eliminate its value in easing the impact between the teeth faces. Thus, the use of the tapered teeth as above set forth not only is advantageous in its own right but it also and unexpectedly makes possible the still further advantages of reducing the mass of the member which reciprocates as the teeth contact and interengage with other. Further, the greater mating or contacting surfaces on the interengaging teeth reduce the unit area reaction of the teeth to such force as is generated between the interengaging teeth and hence the bounce-back tendency between the teeth is reduced. With such reduction in the bounce-back tendency, the resilient means will more quickly terminate the motion of the one set of teeth away from the other and return said one set of teeth toward the other. This will more quickly effect final interengagement between said teeth and thus still further reduce the rattling of said teeth prior to said interengagement. It will thus be seen that these desirable effects are cumulative and will effect a very rapid and relatively quiet interengagement of the teeth without the need for special synchronizing means.

Accordingly, the objects of the invention include:

(1) To provide jaw clutch structure of such design as to facilitate the entry of the teeth thereof into interengagement with each other with a minimum of clashing therebetween.

(2) To provide jaw clutch structure, as aforesaid, in which the teeth thereof will have a minimum tendency to reject or repel each other during an interengagement operation.

(3) To provide a jaw clutch structure, as aforesaid, which is particularly adaptable to use in the gear sets of automotive transmissions, two speed axles and the like but which will nevertheless have a wide range of possible usefulness.

(4) To provide jaw clutch structure, as aforesaid, in which the teeth thereof will tend to repel each other but without undue clashing or wear in so doing until same are substantially synchronized and which will then become interengaged with respect to each other without undue clashing.

(5) To provide jaw clutch structure, as aforesaid, in which the teeth thereof, while tending to repel each other during non-synchronous operation of the respectively adjacent parts, will do so smoothly and without tendency to bounce or shock the sliding part excessively.

(6) To provide jaw clutch structure, as aforesaid, which will be easy to manufacture so as not to increase the cost thereof appreciably over that of present designs.

(7) To provide jaw clutch structure, as aforesaid, in which the teeth thereof will tend to center each other as same approach interengagement.

Other objects and purposes of the invention will be apparent to persons acquainted with a device of this general sort upon reading the following disclosure and inspection of the accompanying drawings.

In the drawings:

FIGURE 1 is a central cross-sectional view of part of one common form of two speed axle illustrating a typical environment in which the clutch mechanism of the invention may be used.

FIGURE 2 is a partially sectional view substantially as taken along the line II—II in FIGURE 1.

FIGURE 3 is an enlarged sectional view taken along the line III—III of FIGURE 2.

FIGURE 4 is a sectional view taken along the line IV—IV in FIGURE 3.

FIGURE 5 is a partially central cross-sectional view of a fragment of an alternate clutch mechanism embodying the invention.

FIGURE 6 is a fragment of FIGURE 5 showing a different position of operation.

FIGURE 7 shows a modification applicable to a portion of the apparatus shown in FIGURE 1.

FIGURE 8 is a fragmentary section taken on the line VIII—VIII of FIGURE 7.

FIGURE 9 is a fragmentary section taken on the line IX—IX of FIGURE 7.

For convenience in description, the terms "inner," "outer" and words of similar import as used herein shall have reference to the geometric center of the gear mechanism or parts thereof disclosing the invention. The terms "left," "right" and derivatives thereof shall refer to the corresponding ends of said gear mechanism as appearing in the drawings.

General description

In working with this problem, I have found that the objects and purposes above set forth may be accomplished in part by tapering the meeting edges of both sets of said teeth in parallel relationship to each other and in a radial direction at an angle of between about 30 and about 40 degrees to the axis of the rotating parts with an optimum at about 35 degrees. If the angle of taper is greater than about 40 degrees then it becomes too steep and the teeth tend to bounce against each other and the sliding part rattles and is repelled excessively. On the other hand, if the angle of taper is less than about 30 degrees, there is often required an excessive axial travel of the sliding part to effect suitable interengagement. A slight chamfering of the corner to remove sharp edges is also desirable.

The objects above named are further accomplished in the modification, also hereinafter shown, in which the mass of the portion caused to reciprocate by the preliminary contact of the teeth prior to actual interengagement is diminished whereby the teeth strike each other with much less force than when such mass is of higher magnitude and accordingly both noise and wear resulting therefrom are appreciably and further diminished.

Detailed construction

The gear mechanism 10 (FIGURE 1) which has been selected to illustrate one embodiment of the invention, is generally similar to the structure disclosed in United States Patent to Russell No. 2,754,692, to which reference is invited for further details of such construction. For the present purposes, however, it is sufficient to state here that there is shown in FIGURE 1 a portion of a two speed differential axle assembly. A frame structure fragmentarily indicated at 11 rotatably supports through a bearing 12 the usual ring gear fragmentarily indicated at 13. Said ring gear is driven by a toothed portion 14 which in turn is driven from an input shaft and conventional pinion schematically indicated at 16 and 17. Said ring gear has a set of internal teeth 18 which are meshed with a plurality of planet gears one of which is shown at 19 and indicated as supported on a stub shaft 20. Said stub shaft 20 is supported on a spider 21 which spider carries a plurality of radially arranged stub shafts of which two are shown at 22 and 22a. Each of said stub shafts carries a pinion 23 and said pinions are supported on a bevel gear 24. Said spider 21 is thus arranged for rotation around the axis of said bevel gear 24 in response to driving of the planetary gears 19 by the internal teeth 18. Said spider 21 also carries a spider ring gear 25 having teeth 26, the same being fastened thereto by a plurality of pins, of which one appears at 27.

The bevel gear 24 is supported on the splines 28 of an an output shaft 29. Thus, rotation of the spider 21 around the axis of the bevel gear 24 acts through the differential mechanism including the pinion 23 and bevel gear 24 to effect rotation of the shaft 29 in a well understood and conventional manner.

The clutch mechanism 31 (FIGURES 1 and 2) includes an elongated hollow and substantially cylindrical sleeve or clutch member 34 (FIGURE 1), which is concentrically sleeved around, and is rotatably supported with respect to, the output shaft 29. The clutch member 34 is of such axial length that it can extend from a point within, and radially aligned with, the planet pinions 19 to a point substantially beyond the left side of the spider ring gear 25. The clutch member 34 has axially elongated teeth 36 at the rightward end thereof, which teeth 36 continuously engage the teeth 35 on the planet pinions 19 and, accordingly, combine with the adjacent portion of the member 34 to serve the purpose of a sun gear. The clutch member 34 also has external teeth 37 (FIGURE 1) near the leftward end thereof which, when the clutch member 34 is in its rightward position with respect to the shaft 29, are engageable with the teeth 33 on a stationary internal ring 32 which in turn is mounted on the frame 11.

The clutch member 34 is supported for axial movement into a leftward position (FIGURE 2), where the teeth 36 on the member 34 are simultaneously engageable with the teeth 35 on the planet gears 19 and the teeth 26 on the spider ring 25. In this position the teeth 37 are disengaged from the stationary ring teeth 33.

The clutch member 34 has an annular groove 38 (FIGURE 2) adjacent its leftward end into which portions of the shift yoke 39 are slidably receivable for effecting lengthwise axial movement of the clutch member 34 between its two above-described positions with respect to the parts associated therewith.

The structure thus far described is conventional and is set forth merely to illustrate a specific environment within which the invention hereinafter described is utilized.

Attention will now be turned to the sloping of the facing surfaces of the interengageable jaw clutch teeth and reference will for this purpose be made particularly to the opposed ends 44 and 45 of the teeth 24 and 36, respectively, and to the opposed ends 42 and 43 of the teeth 33 and 37, respectively.

The gear teeth 33 and 37 (FIGURE 4) on the gear 32 and clutch member 34, respectively, have engageable, axial end faces 42 and 43 which are beveled or tapered at an angle of approximately 35 degrees to the rotational axis of the clutch member 34. This angle may be varied somewhat, as between 30 and 40 degrees, while still providing a substantially satisfactory performance. However, it has been found by experimentation and tests that an angular relationship of approximately 35 degrees produces the most satisfactory results, inasmuch as it provides the maximum of increased contact area at the mating ends of the teeth and a maximum absorption of repelling tendency between teeth without requiring excessive axial travel of the movable clutch member. The faces 42 and 43 are arranged to define cones having respectively parallel elemental lines so that said teeth will lie substantially within and thereby define the same conical surface just as they enter into engagement.

In a similar manner, the engageable axial end faces 44 and 45 (FIGURE 2) on the gear teeth 23 and clutch teeth 36 are also tapered, preferably at an angle of approximately 35 degrees to the lengthwise rotational axis of the clutch member 34. It has been found that by providing the tapered, opposing faces 42, 43 and 44, 45 on the gear teeth 33, 37 and 23, 36, respectively, shifting of the clutch member 34 between its FIGURE 1 and FIGURE 2 positions can be effected with a minimum of clashing between, hence a minimum of wear upon, the teeth involved, without requiring excessive movement of the clutch member 34 with respect to the shaft 14.

When the clutch member 34 is in its FIGURE 1 position, the clutch teeth 36 are engaged with the teeth 24 of the planet pinions 18 and the clutch teeth 37 are fixed to the frame so that the apparatus is in reduction drive. Thus, the output shaft 29 is rotating at its lower speed with respect to a given speed for the input shaft 16. When the clutch member 34 is shifted from its FIGURE 1 position into its FIGURE 2 position the clutch teeth 36 engage both the teeth 35 on the planet gears 19 and the teeth 26 on the spider ring 25 so that said planet pinions are locked against rotation with respect to the planet carrier 21, whereby the gear mechanism 10 is placed in high or direct speed drive.

If the angle of radial taper on the opposing faces 42, 43 and 44, 45 (FIGURES 1 and 2) of said teeth appreciably exceeds the approximate range of between 30 degrees and 40 degrees, such taper being the same on the opposing faces of both sets of interengageable teeth, there is a substantial tendency for the jaw clutch parts having such teeth to bounce away from each other during an engaging operation resulting in rapid wear and deterioration of the teeth. Where the angle of taper is below this range but above 12 degrees, the system will be operative but the axial travel required of the movable clutch member is excessive for most commercial uses, particularly in such automotive uses as multi-speed axles and transmissions. Where the angle of the interengaging faces becomes less than about 12 degrees, then a wedging occurs between the mating faces of the teeth and the structure is entirely inoperative. A further refinement in the structure of the present invention, although not in all cases essential, is the increasing of the circumferential tooth clearance between the interengageable clutching members. For example, in a clutch having a slidable clutch element weighing 8¾ pounds, having 22 bullet nosed teeth on 3.66 inch pitch diameter, and a 70 pound spring force urging engagement, a circumferential tooth clearance of approximately 0.016 inch would be normally used. Where teeth are formed according to the present invention, best results are obtained by increasing the clearance to 0.028 inch inasmuch as such increased clearance will still further minimize the shifting time and the tooth hammering.

*Alternate structure*

In FIGURE 5 there is shown a modification of the previously described apparatus wherein a slidable clutch member 51 corresponds to the slidable clutch member 34 above referred to. In this modification, said clutch member has been modified so that the rightward movement of clutch member 51 into reduced speed drive can be effected with less force than a corresponding movement of the clutch member 34 (FIGURE 2). More specifically, the leftward end of the clutch member 51 (FIGURE 5) is splined at 52 in the region thereof where the corresponding portion of the clutch member 34 has the clutch teeth 37. An annular gear 53 is internally splined for non-rotatable, but axially slidable, engagement with the splines 52 on the clutch member 51. The annular gear 53 has external clutch teeth 54 which may be similar to and which serve the function of the clutch teeth 37 on the clutch member 34 (FIGURE 2). As shown in FIGURE 6, each spline 52 on the alternate clutch member 51 has at its rightward end a radially outwardly extending shoulder 56 against which the ring gear 53 abuts for limiting rightward movement thereof.

An annular channel element 57 (FIGURE 5) encircles the leftward end of the clutch member 51 and snugly abuts the adjacent, leftward ends of the splines 52. The annular channel 57 is held upon the clutch member 51 and against said splines 52 by a conventional retaining ring 58 which is removably receivable into an annular groove 59 in said member 51 adjacent the leftward end thereof. Accordingly, the annular channel 57 is removably held upon the clutch member 51 between the leftward ends of the splines 52 and the retaining ring 58.

The annular groove 62 (FIGURE 5) defined by the annular channel 57 serves the same purpose as the annular groove 38 in the clutch member 34 (FIGURE 2), namely, to provide means for engagement of the clutch member 51 by a suitable shift mechanism, such as the shift yoke 39a.

Annular resilient means 63 are provided between the annular gear 53 and the adjacent flange 64 of the channel 57. Said resilient means may be any of several known types such as a wave spring of standard and known form or such as the compressible ring shown at 65 in the drawing. In this embodiment said ring is formed of a highly resilient rubber and is provided with a cover flange 65a which will slide over the adjacent flange 64 so as not to interfere therewith when said ring 65 is compressed by leftward (as appearing in the drawings) movement of the ring 53.

The clutch teeth 54 (FIGURE 5) on the gear 53 are engageable by the internal teeth 67 on the ring gear 68, which may be identical with, and serve the same purpose as, the ring gear 32 in FIGURE 2. The engageable, axial end faces 69 and 70 on the clutch 54 and gear teeth 67, respectively, are tapered preferably at an angle approximately 35 degrees to the rotational axis of the clutch memeber 51. As in the case of the tapered faces on the corresponding gear teeth in the clutch mechanism 31, the taper of the faces 69 and 70 may vary with satisfactory performance within the approximate range of 30 degrees to 40 degrees. However, the taper of the opposing faces on two sets of interengageable teeth are the same.

During a shifting operation of the alternate clutch member 51 in a rightward direction (as appearing in FIGURE 5) the opposing faces 69 and 70 on the gear teeth 54 and 67, respectively, will strike each other as they come together during normal non-synchronous rotation. However, the presence of the resilient means 63 plus the axial movability of the ring gear 53, permits the clutch member 51 to shift smoothly toward, if not into, its rightward position even though the opposing faces 69 and 70 strike each other and do not interengage during the initial portion of the shifting movement. Moreover, the sudden build-up in force, which could occur under these circumstances if the clutch teeth 54 are rigidly secured to the clutch member 51, is minimized. Due to the relative rotation which is normally occurring between the teeth 54 and 67 just prior to a shifting operation for effecting their engagement, the period during which the opposing faces 69 and 70 are in engagement, as appearing in FIGURE 6, is normally relatively very short. Thus, as soon as the gear teeth 54 and 67 reach synchronism the resilient means 63 will move the ring gear 53 rightwardly and quickly against the shoulders 56 so that the teeth 54 and 67 will become engaged. The disengagement of the teeth 54 from the teeth 67 is not affected adversely by the presence of the resilient means 63 or by the axial movability of the annular gear 53. A further modification appears in FIGURES 7, 8 and 9. The structure is here shown for cushioning the high (or direct) speed clutch teeth, namely, the teeth 26 and 36 shown in FIGURE 1. The parts corresponding to those shown in FIGURE 1 are numbered similarly in FIGURES 6, 7 and 8 together with the subscript "a" and will need no further description. In FIGURE 7, however, it is shown that teeth 26a corresponding to the teeth 26 of FIGURE 1 are not fastened rigidly to the ring 25a, but instead are arranged for a slight axial movement to absorb the shock of the interengaging teeth 36a. The toothed ring 71 carrying the teeth 26a is provided with radially extending lugs 72 which are received into suitable slots 73 provided in the ring 25a for permitting axial movement of said toothed ring 71 with respect thereto while preventing circumferential movement of said toothed ring with respect to the ring 25a. Interposed into a suitably cut-out notch 74 in the end of the ring 71 opposite to that from which the teeth thereof are engaged by the teeth 36a, is a resilient ring 76. Said ring may be made of any convenient material, although rubber is preferred. Said ring 76 is backed by a steel ring 77. An annular plate 78 is fastened to the ring 25a by suitable screws and holds the rings 77 and 76 in place. The external diameter of the notched (leftward) portion of the ring 71 is less than the internal diameter of both of the annular members 77 and 78 so that the ring 71 may respond to pressure applied thereto by the teeth 36a and slide through and past said members 77 and 78 if desired.

It will be recognized that while the resilient backing means for the high speed gear immediately above described may conveniently be used in cooperation with the resilient backing of the low speed gear 53, such association of these parts is a matter of convenience and the basic principles of the invention still may be utilized with other resilient backing means in either or both of these locations.

In FIGURE 5 it will be noted that the resiliently movable toothed ring 53 is on the axially slidable portion of the mutually interengageable parts, while in FIGURE 7, the resiliently movable toothed ring 71 is on the axially stationary portion of the interengageable parts. Thus, it will be recognized that the location of the resiliently reciprocable ring on one or the other of the interengageable parts is a matter of choice and may be applied to either or both pairs of interengageable parts as desired.

Although particular preferred embodiments of the invention have been described in detail above for illustrative purposes, it will be understood that variations or modifications of such disclosure, which come within the scope of the appended claims, are fully contemplated.

What is claimed is:

1. A drive mechanism comprising a clutch, drive means and a shaft;
   said clutch comprising a pair of members each having a toothed surface adapted to selectively coact in meshing interengagement;
   one of said toothed members forming a part of the drive means;
   means supporting the other toothed member free from engagement with the shaft and for relative axial movement directly into and out of toothed engagement with said one of said toothed members;
   means independent of said other toothed member for coupling the drive means with the shaft;
   said toothed members coacting independently of the shaft when engaged and disengaged respectively to change the drive relationship between the drive means and the shaft;
   the teeth on each of said members having chordal widths adapted to coact in meshing engagement to restrain relative rotation between the teeth;
   the mating axial end faces on the teeth of said toothed members adjacent each other, when not in meshing engagement, being inclined in parallel planes at substantially the same angle within 30 to 40 degrees to the axis of rotation of said toothed members, said mating axial end faces independently coacting to synchronize and thereby facilitate their meshing engagement.

2. A clutch mechanism comprising:
   a first rotatable, annular toothed member having axially extending, external teeth;
   a second, rotatable, annular toothed member having axially extending, internal teeth;
   means concentrically supporting said annular toothed members for relative axial movement with respect to each other whereby the teeth on the first member are meshingly interengageable with the teeth on the second member, the opposed axial end faces on said teeth of both annular members being sloped at substantially the same angle to the axis of rotation of said annular members and said angle being within the range of about 30 to about 40 degrees, and the teeth of one of said members being axially movable against a resilient resistance with respect to said one member, said resilient resistance resisting movement of said one member axially away from the other member.

3. The device defined in claim 2 wherein said last-named teeth are arranged on a ring splined to said one member and movable axially between positive limits; and resilient means constantly urging said ring in an axial direction toward the other of said toothed members.

4. A clutch mechanism comprising:

a first annular toothed member having external teeth;

a second annular toothed member having internal teeth, the teeth thereof being engageable with the teeth of said first annular toothed member;

support means concentrically supporting said annnular toothed member for relative axial movement with respect to each other whereby the teeth on the first member are interengageable with the teeth on the second member, the opposed axial end faces on said teeth of both annular members being sloped at substantially the same angle to the axis of rotation of said annular members and said angle being within the range of about 30 to about 40 degrees, one of said toothed members being axially movable with respect to said support means therefor;

resilient means acting between said one toothed member and said support means therefor constantly urging said toothed member in an axial direction with respect to said support means toward the other of said members; and means positively limiting the distance said one toothed member can move with respect to its support means in such direction under said urging to a distance less than the distance required to disengage said members after engagement has commenced while being still sufficient to absorb the shock of engagement.

References Cited by the Examiner

UNITED STATES PATENTS

| | | | |
|---|---|---|---|
| 989,007 | 4/1911 | Hanson | 192—67 X |
| 1,225,144 | 5/1917 | Land | 192—20 |
| 2,348,717 | 5/1944 | Banker | 192—67 |
| 2,416,083 | 2/1947 | Battaline | 192—67 |
| 2,521,730 | 9/1950 | Keese | 192—53.7 |
| 2,821,277 | 1/1958 | Hughes | 192—67 |
| 2,846,038 | 8/1958 | Brownyer | 192—67 X |
| 2,892,524 | 6/1959 | Sinclair | 192—67 |
| 2,919,774 | 1/1960 | Russell | 192—53.6 |
| 3,031,900 | 5/1962 | Stump | 74—339 |

FOREIGN PATENTS 909,858   1/1946   France.

DAVID J. WILLIAMOWSKY, *Primary Examiner.*

THOMAS J. HICKEY, *Examiner.*

R. V. SLOAN, *Assistant Examiner.*